US012006097B2

(12) United States Patent
Federici et al.

(10) Patent No.: US 12,006,097 B2
(45) Date of Patent: Jun. 11, 2024

(54) CONTAINER FOR ARTICLES, RELATIVE BLANK AND METHOD OF MAKING

(71) Applicant: G.D S.P.A., Bologna (IT)

(72) Inventors: Luca Federici, Bologna (IT); Luca Paradiso, Bologna (IT)

(73) Assignee: G.D S.P.A., Bologna (IT)

( * ) Notice: Subject to any disclaimer, the term of this patent is extended or adjusted under 35 U.S.C. 154(b) by 62 days.

(21) Appl. No.: 17/618,597

(22) PCT Filed: Jun. 10, 2020

(86) PCT No.: PCT/IB2020/055444
§ 371 (c)(1),
(2) Date: Dec. 13, 2021

(87) PCT Pub. No.: WO2020/250143
PCT Pub. Date: Dec. 17, 2020

(65) Prior Publication Data
US 2022/0297872 A1 Sep. 22, 2022

(30) Foreign Application Priority Data
Jun. 14, 2019 (IT) ........................ 102019000009009

(51) Int. Cl.
*B65D 3/06* (2006.01)
*B31B 50/26* (2017.01)
(Continued)

(52) U.S. Cl.
CPC ................ *B65D 3/06* (2013.01); *B31B 50/26* (2017.08); *B31B 50/624* (2017.08); *B65D 3/14* (2013.01);
(Continued)

(58) Field of Classification Search
CPC .......... B65D 3/06; B65D 3/14; B65D 5/0209; B65D 5/0227; B65D 5/4266; B65D 3/12;
(Continued)

(56) References Cited

U.S. PATENT DOCUMENTS 1,184,956 A * 5/1916 Hoppke ............... B65D 5/2047 229/4.5
3,912,331 A * 10/1975 Turner ................. B65D 5/3614 229/125.17
(Continued)

FOREIGN PATENT DOCUMENTS

GB 2451281 A 1/2009

OTHER PUBLICATIONS

International Search Report and Written Opinion dated Aug. 27, 2020 from Internatonal Patent Application No. PCT/IB2020/055444.
(Continued)

*Primary Examiner* — Christopher R Demeree
(74) *Attorney, Agent, or Firm* — SHUTTLEWORTH & INGERSOLL, PLC; Timothy J. Klíma

(57) ABSTRACT

A container for articles, including: an upper end and a lower end; a first lateral wall and a second lateral wall; a bottom, including a first bottom wall and a second bottom wall. The container includes means for blocking the bottom, including a first abutment flap fixed to the inner surface of the first lateral wall and including a lower abutment edge; and a second abutment flap including an upper abutment edge and connected to the second bottom wall. The second abutment flap is folded against the inner surface of the first lateral wall for abutting, with the relative upper abutment edge, the lower abutment edge of the first abutment flap.

8 Claims, 5 Drawing Sheets

(51) Int. Cl.

| | |
|---|---|
| ***B31B 50/62*** | (2017.01) |
| ***B31B 100/00*** | (2017.01) |
| ***B31B 110/10*** | (2017.01) |
| ***B65D 3/14*** | (2006.01) |
| ***B65D 5/02*** | (2006.01) |
| ***B65D 5/42*** | (2006.01) |

(52) U.S. Cl.
CPC ......... *B65D 5/0209* (2013.01); *B65D 5/0227* (2013.01); *B65D 5/4266* (2013.01); *B31B 2100/00* (2017.08); *B31B 2110/10* (2017.08)

(58) Field of Classification Search
CPC .......... B65D 5/0254; B65D 5/00; B65D 5/42; B65D 3/04; B65D 3/20; B65D 5/0245; B65D 5/3621; B65D 5/02; B65D 2543/00037; B65D 5/443
USPC ....... 229/107, 104, 4.5, 117.06, 128, 117.04, 229/405, 117.03, 126, 125.17, 122.31, 229/183
See application file for complete search history.

(56) References Cited

U.S. PATENT DOCUMENTS

| | | | | |
|---|---|---|---|---|
| 4,109,848 | A * | 8/1978 | Kipp | B65D 3/02 229/4.5 |
| 6,003,759 | A * | 12/1999 | Kenner | B65D 5/0209 229/182.1 |
| 6,152,359 | A | 11/2000 | Clark | |
| 6,170,740 | B1 * | 1/2001 | Clark | B65D 5/0209 229/128 |
| 6,513,704 | B1 * | 2/2003 | Perot | B65D 5/0209 229/5.5 |
| 7,578,426 | B2 * | 8/2009 | Wende | B65D 5/0209 229/5.5 |
| 2013/0048702 | A1 | 2/2013 | Burton | |
| 2013/0193196 | A1 | 8/2013 | Hallam et al. | |

OTHER PUBLICATIONS

Chinese Office Action dated Aug. 19, 2023 from counterpart Chinese Patent Application No. 202080043196.6.

* cited by examiner

CONTAINER FOR ARTICLES, RELATIVE BLANK AND METHOD OF MAKING

This application is the National Phase of International Application PCT/162020/055444 filed Jun. 10, 2020 which designated the U.S.

This application claims priority to Italian Patent Application No. 102019000009009 filed Jun. 14, 2019, which applications are incorporated by reference herein.

TECHNICAL FIELD

This invention falls within the technical sector of containers for articles obtained from blanks, generally made of paperboard or in any case of cellulose-based material. More in detail, the invention relates to a container for articles, the relative blank and a method for making the container.

This type of container is used in various sectors (cosmetics, food etc.) for containing articles of various types.

BACKGROUND ART

A container of this type usually has lateral walls, a bottom and an upper opening opposite the bottom, which may be closed by a lid or by a closing flap connected to the lateral walls.

Patent document GB2451281 describes a container for articles according to the preamble to claim 1.

Generally, a container of this type has a longitudinal axis of extension and a substantially frustoconical cross-section, with the smaller base and the truncated cone which constitutes the bottom, and the larger base which constitutes the opening, or a circular or oval cross-section.

A container of this type is obtained by folding and gluing a blank which in the majority of cases is made of paperboard. More in detail, the parts which are folded and glued are usually the lateral walls, which are joined together to define the inner space of the container, and the bottom, which must remain firmly closed once the container has been formed.

For this purpose, the bottom consists of two panels which, when the container is completed, are superposed on each other. The two panels are locked by interference between the lateral walls of the container, in an operating configuration wherein they are positioned at right angles to the axis of extension of the container. The stability of the bottom panels in the relative operating configuration, once the container is made, is therefore essential to maintain the shape of the container.

However, it is often the case that unwanted impacts or pressures, even minimal, incurred at the bottom, result in the panels which constitute the bottom modifying the relative configuration relative to the operating ones, causing a "flattening" of the container, which collapses on itself, thereby losing the shape which was given to it.

AIM OF THE INVENTION

The aim of this invention is to overcome the above mentioned disadvantage.

The aim is achieved by providing a container for articles, a blank and a method for making articles according to the accompanying claims.

Advantageously, the invention guarantees the stability of the container once formed, in particular the stability of the bottom is guaranteed, allowing the shape of the container to remain with the passage of time, even in the case of impacts or stresses accidentally incurred on the bottom.

BRIEF DESCRIPTION OF THE DRAWINGS

These and other advantages are more apparent in the description which follows, with reference to the accompanying drawings, in which.

DETAILED DESCRIPTION OF PREFERRED EMBODIMENTS OF THE INVENTION

Figure 1:
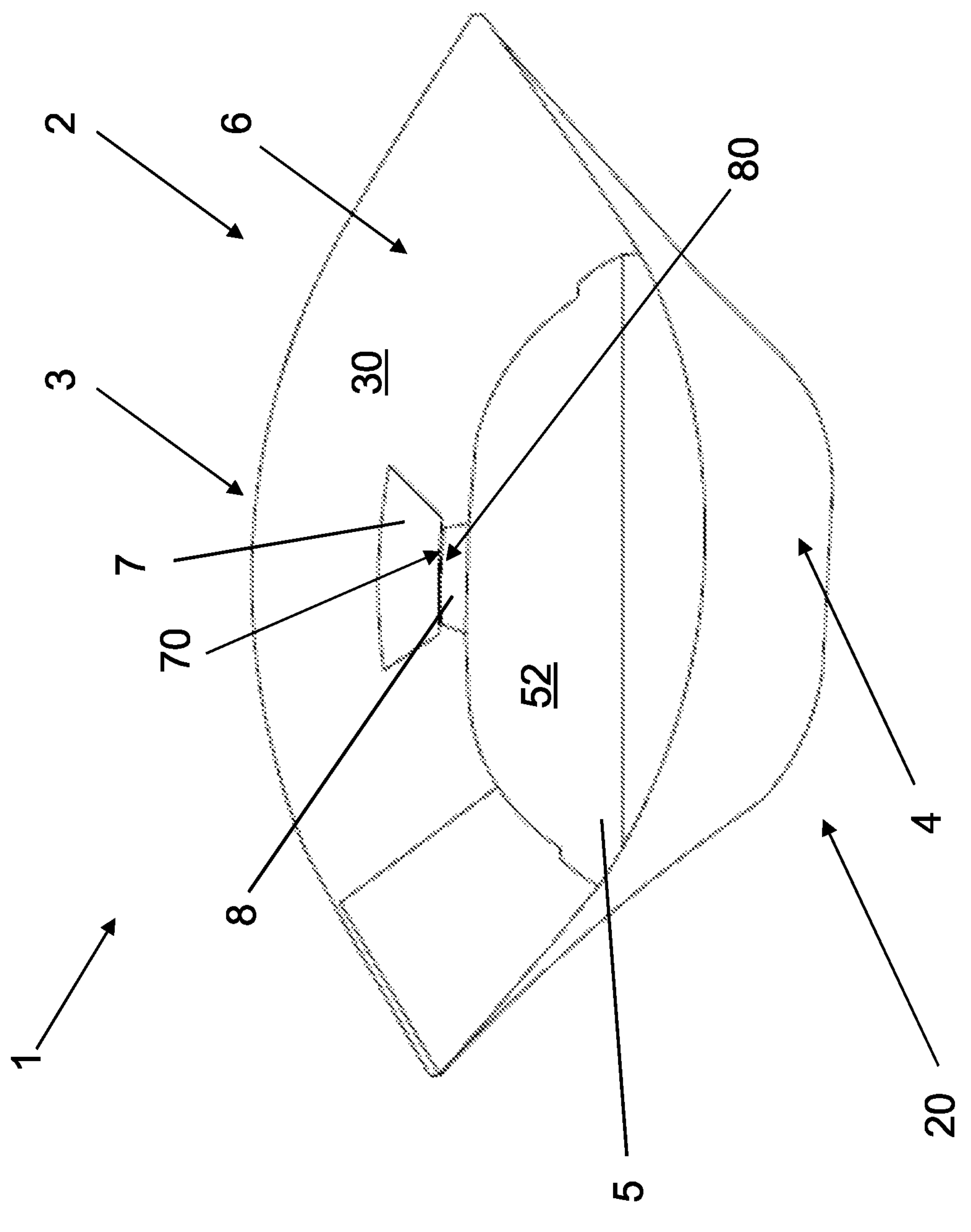
FIG. 1 is a perspective view from above of a container for articles according to the invention.
Figure 2:
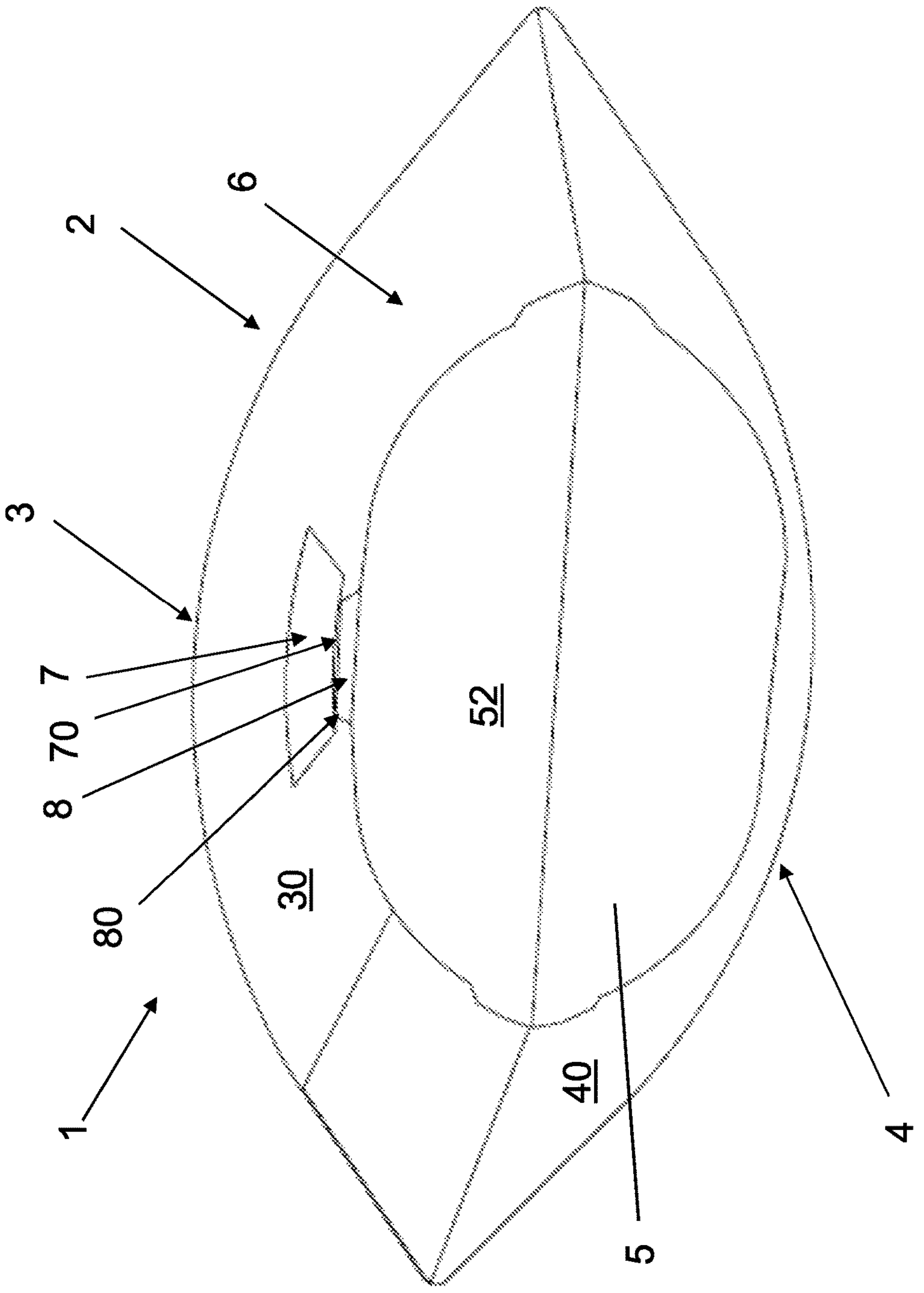
FIG. 2 is a plan view from above of the container of FIG. 1.
Figure 3:
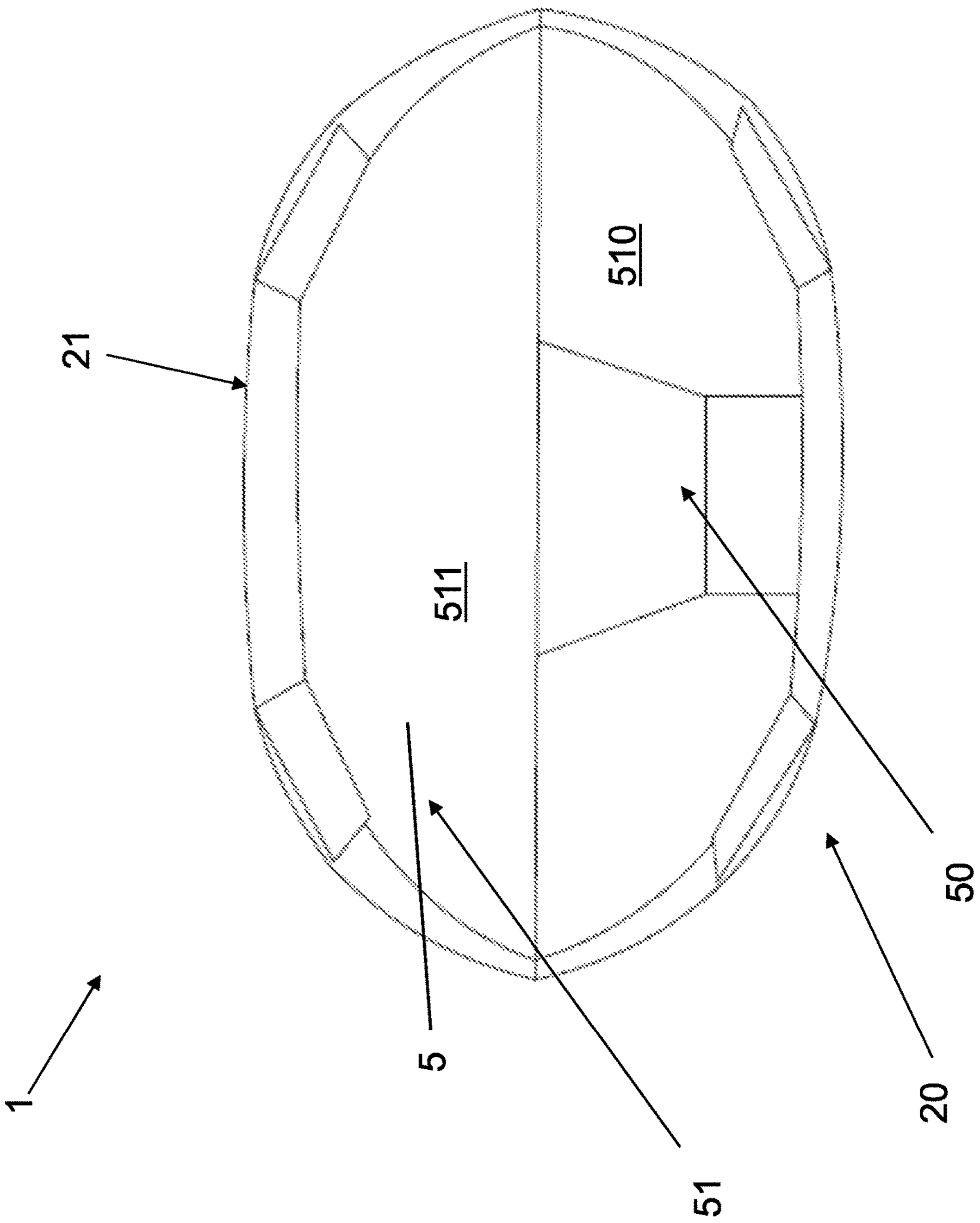
FIG. 3 is a plan view from below of the container of FIG. 1.

With reference to FIGS. 1 to 3, the numeral 1 denotes a container according to the invention.

The container 1 according to the invention may be used in various sectors (cosmetics, food etc.) for containing articles or products of various types.

In the preferred embodiment, the container 1 has a longitudinal axis of extension and is equipped with an upper end 2 and a lower end 20 opposite each other (see FIG. 1).

The container 1 according to the invention comprises: a first lateral wall 3 and a second lateral wall 4 connected to each other, each having an inner surface 30, 40 and an outer surface (facing each other); and a bottom 5, positioned at the lower end 20 of the container 1.

The bottom 5 in turn comprises a first bottom wall 51 connected to the first lateral wall 3 and a second bottom wall 52 connected to the second lateral wall 4. Preferably, the first bottom wall 51 is made integrally with the first lateral wall 3 and the second bottom wall 52 is made integrally with the second lateral wall 4.

The first bottom wall 51 and the second bottom wall 52 are superposed on each other, with the first bottom wall 51 outermost with reference to the internal space of the container 1 (see in particular FIG. 3).

The container 1 also comprises an upper opening 6 (shown in FIGS. 1 and 2), opposite the bottom 5, at the upper end 2 of the container 1, to allow the introduction of articles/products inside the container 1.

More in detail, the container 1 according to the invention further comprises bottom blocking means 7, 8 (see FIGS. 1 and 2), in turn comprising a first abutment flap 7 which is fixed to the inner surface 30 of the first lateral wall 3. The first abutment flap may be fixed substantially at the bottom end 20 of the container 1: this means that it is proximal to the lower end 20 of the container 1 and distal to the upper end 2 of the container 1.

The first abutment flap 7 comprises a lower abutment edge 70.

Moreover, the bottom blocking means 7, 8 comprises a second abutment flap 8 connected to the second bottom wall 52 and comprising an upper abutment edge 80. In detail, the second abutment flap 8 is folded against the inner surface 30 of the first lateral wall 3, at the lower end 20 of the container 1 for abutting with the relative upper abutment edge 80 the lower abutment edge 70 of the first abutment flap 7. Preferably, the second abutment flap 8 is made integrally with the second bottom wall 52.

Advantageously, the bottom locking mans 7, 8, configured in this way, guarantee that the container 1 maintains its shape even in the case of unwanted stresses or pressures incurred at the bottom 5, unlike the prior art containers. In particular, the first abutment flap 7 and the second abutment flap 8 are mutually prepared in such a way that the second abutment flap 8, folded against the inner surface 30 of the first lateral wall 3, abuts with the respective upper abutment edge 80 against the lower abutment edge 70 of the first abutment flap 7. In this way, the second abutment flap 8 is blocked by the lower abutment edge 70 of the first abutment flap 7 and, therefore, remains fixed in that position even in the case of stresses. Consequently, the entire bottom 5 of the container 1 stably maintains its configuration. On the other hand, in the absence of the first abutment flap 7 and the second abutment flap 8 prepared as described above, an unwanted stress of the bottom 5 would result in the movement, necessarily causing the "collapse" of the lateral walls which are positioned around the bottom and the flattening of the container on itself (that is to say, of the lateral walls on one another), as occurred in the prior art. The term "stable configuration of the container" means an operating configuration wherein the bottom is substantially at right angles to the axis of extension of the container.

The container 1, in its preferred embodiment, has a substantially frustoconical cross section, with the smaller base of the truncated cone forming the bottom 5, and the larger base of the truncated cone forming the upper opening 6, if necessary closed by a lid or by another closing element (situation not illustrated). However, it is clear that any other shape may be provided for the container 1, for example the opening and the bottom may have the same shape and size.

Preferably, the first bottom wall 51 and the second bottom wall 52 are connected to each other (partly) by adhesive applied at an edge of them.

In the embodiment illustrated, the first bottom wall 51 has, in a first relative portion 510, proximal to the first lateral wall 3, an opening 50 (that is to say, an absence of material) with dimensions preferably equal to those of the first abutment flap 7 (see in detail FIG. 3). It is clear that the dimensions of the opening 50 may also be greater than those of the first abutment flap 7. The opening 50, obviously, when the container 1 is formed, is not a through opening since it is occluded by the second bottom wall 52. The opening 50 may also be larger than the first abutment flap 7, depending on whether or not the container 1 provides a waste at the bottom 5, as described in more detail below.

In accordance with the preferred embodiment of the invention, the bottom 5, the first and the second lateral walls 3, 4 and the bottom blocking means 7, 8 are made of cellulose-based sheet material (preferably paperboard). Moreover, the first abutment flap 7 is preferably glued to the inner surface 30 of the first lateral wall 3.

With reference to the preferred embodiment illustrated, the lower end 20 of the container 1 has an end edge 21 (shown in FIG. 3) which defines a closed profile, that is to say, a closed loop profile (although its shape is not necessarily ring-shaped). The bottom 5 of the container 1 is positioned at a certain distance, which is not zero, from the above-mentioned end edge 21, in such a way as not to protrude relative to the above-mentioned end edge 21 (see FIG. 3). In other words, the bottom 5 of the container 1 is more inside than the above-mentioned end edge 21, with reference to the inner space of the container 1. Advantageously, this aspect reduces the possibility of unwanted pressures or impacts on the bottom 5, since the latter is not exposed to external stresses.

The invention further relates to a blank 1' (illustrated in FIGS. 4 and 5) for making a container 1 for articles according to any one of the embodiments described above.

The blank 1' comprises a first lateral panel 3' and a second lateral panel 4' connected to each other (in particular made integral with each other) and designed for defining respectively the first lateral wall 3 and the second lateral wall 4 of the container 1 described above.

The blank 1' also comprises a first bottom panel 51' and a second bottom panel 52', each comprising a perimeter edge 501', 502'. The first bottom panel 51' and a the second bottom panel 52' are connected respectively to the first lateral panel 3' and the second lateral panel 4' and are designed to be superposed on each other in order to define the bottom 5 of the container 1 described above. Substantially, therefore, the first bottom panel 51' and the second bottom panel 52' of the blank 1' correspond, respectively, to the first bottom wall 51 and the second bottom wall 52 of the container 1 described above.

Moreover, the blank 1' comprises a preferential fracture line 50' provided on the first bottom panel 51', and which delimits a portion 7' preferably equal to the above-mentioned first abutment flap 7 described above with regard to the bottom blocking means 7, 8 of the container 1 (reference should therefore be made to what has been said about the first abutment flap 7). It is clear, therefore, that the dimensions of the portion 7' may also be greater than those of the first abutment flap 7.

In other words, the portion 7' delimited by the preferential fracture line 50' is at least partly designed to define the first abutment flap 7 of the container 1. The preferential fracture line 50' is therefore designed to allow the detachment of a part of the first bottom panel 51' to form the first abutment flap 7. More in detail, with reference to the drawings, the preferential fracture line 50' is provided in a first portion 510' of the first bottom panel 51', proximal to the first lateral panel 3'.

The blank 1' also comprises a tab 8' connected to the second bottom panel 52' and which protrudes relative to the corresponding perimeter edge 502', designed to define the above-mentioned second abutment flap 8 of the container 1 (therefore, practically coinciding with the second abutment flap 8, already described above and to which reference should be made for details).

In other words, the preferential fracture line 50' of the first bottom panel 51' and the tab 8' of the second bottom panel 52' are designed to form the bottom blocking means 7, 8 described for the container 1. In particular, the first abutment flap 7 of the container 1 is defined by the detachment of the portion 7' delimited by the preferential fracture line 50' of the first bottom panel 51', as described in more detail with reference to the making method.

Advantageously, the blank 1' according to the invention allows the container 1 described above to be made, which has a bottom 5 with optimum stability, and, therefore, allows the maximum stability of the container 1.

The first lateral panel 3' and the second lateral panel 4' each comprise a lower edge 21' designed to form the end edge 21 of the container 1 described above.

According to the preferred embodiment, the blank 1' further comprises a first connecting strip 31' and a second connecting strip 41', positioned respectively between the first lateral panel 3' and the first bottom panel 51', and between the second lateral panel 4' and the second bottom panel 52' (in particular between the first bottom panel 51' and the end edge 21' of the first lateral panel 3' and between the second bottom panel 52' and the end edge 21' of the second lateral panel 4. With reference to the above description, by using the blank 1' it is possible to make the container 1 wherein the bottom 5 does not protrude beyond the end edge 21 of the lower end 20, thereby avoiding unwanted pressures or impacts on it.

Figure 4:
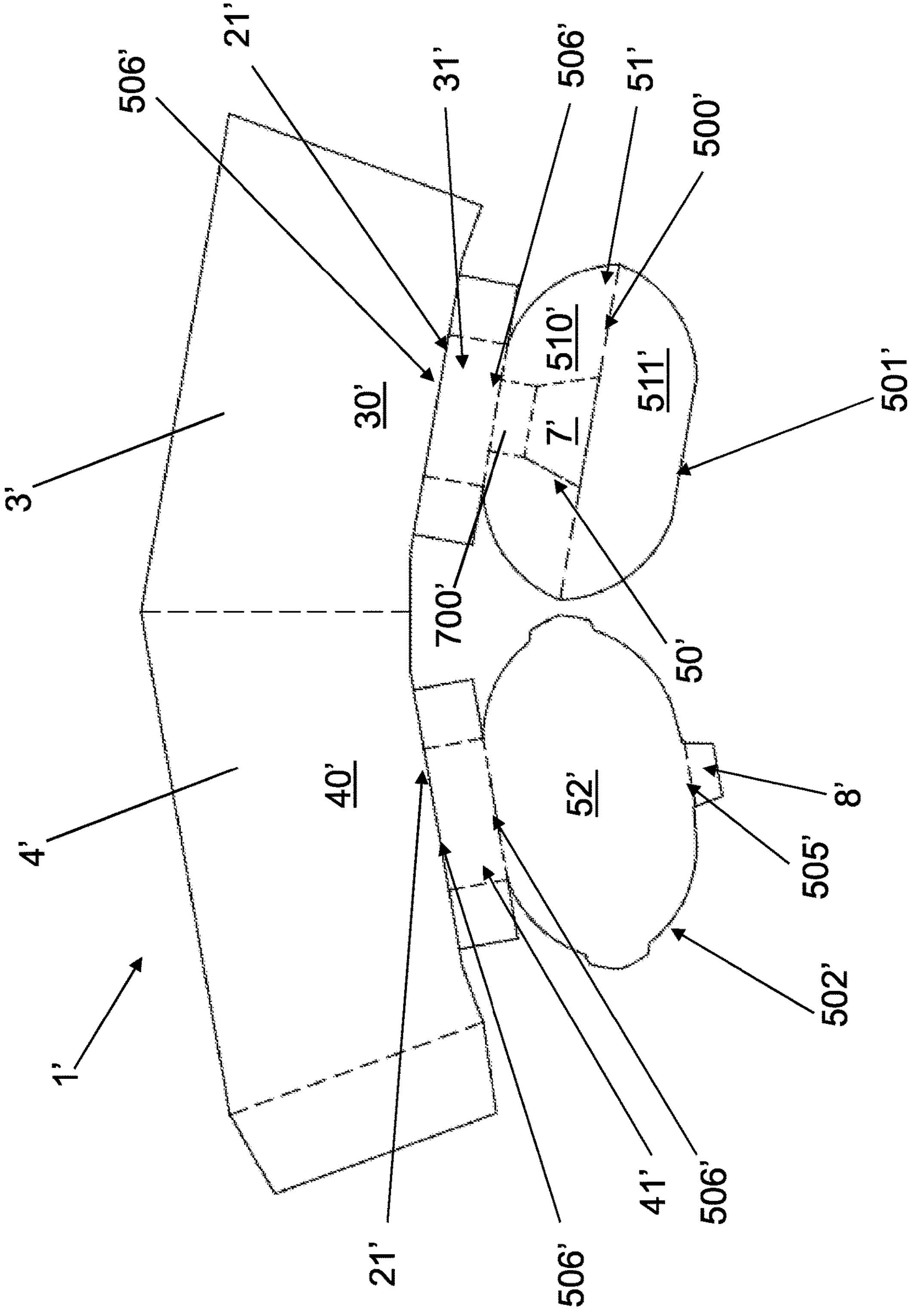
FIGS. 4 and 5 are two variant embodiments of a blank according to the invention.
Figure 5:
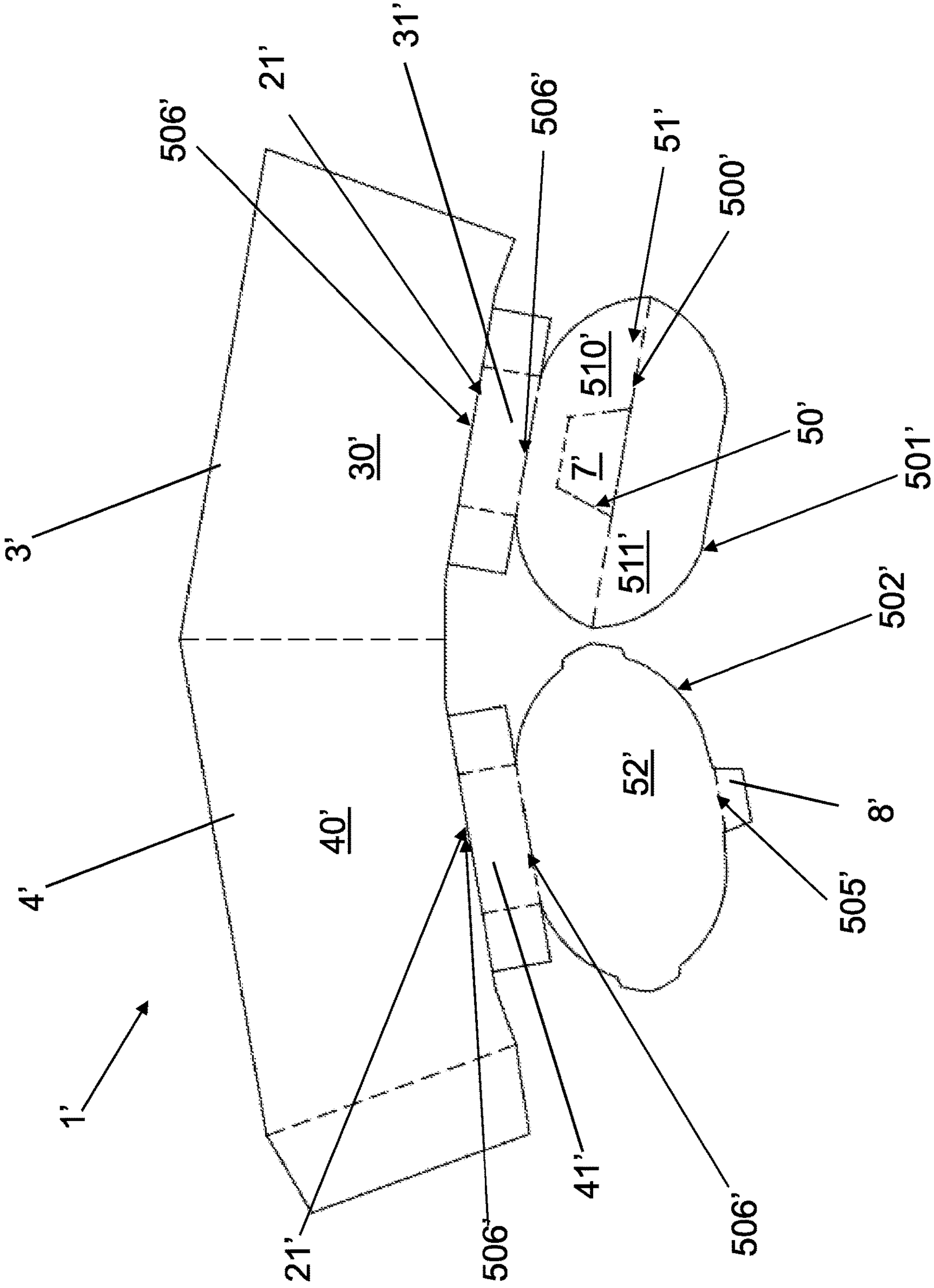

FIGS. 4 and 5 illustrate two variant embodiments of the blank 1' according to the invention. In the variant embodiment of FIG. 4, the preferential fracture line 50' delimits both the portion 7' designed to form the first abutment flap 7 of the container 1, and a waste portion 700' which is then removed. In this case, preferably, the height of the waste portion 700' coincides with, or is greater than, the height of the tab 8', that is, of the second abutment flap 8 of the container 1. In this way, the stability of the container 1 is guaranteed once formed, that is to say, the operating configuration described above with the bottom 5 substantially at right angles to the longitudinal axis of the container 1.

In the variant of FIG. 5, on the other hand, the preferential fracture line 50' delimits only the portion 7' with dimensions equal to the first abutment flap 7 of the container 1; in other words, in this case, there is no waste portion 700' which is, on the other hand, present in the variant embodiment of FIG. 4. In this case, the distance between the preferential fracture line 50' and the distal perimeter edge 502' of the second bottom panel 52' coincides with the height of the tab 8', that is, of the second abutment flap 8 of the container 1. In this way, the stability of the container 1 is guaranteed once formed, that is to say, the operating configuration described above with the bottom 5 substantially at right angles to the longitudinal axis of the container 1.

The blank 1' preferably comprises a plurality of folding lines 500', 505', 506' to facilitate making the container 1. With reference to the accompanying drawings, the first bottom panel 51' of the blank 1' comprises a longitudinal folding line 500', which separates the above-mentioned first portion 510' from a remaining second portion 511'. The longitudinal folding line 500', in the accompanying drawings, divides into two equal parts the first bottom panel 51' in the corresponding first portion 510' and second portion 511'. As shown in the accompanying drawings, part of the preferential fracture line 50' extends along the above-mentioned longitudinal folding line 500'.

Further, another folding line 505' is set up between the second bottom panel 52' and the tab 8', to facilitate the folding of the tab 8' during the formation of the container 1.

Again with reference to FIGS. 4 and 5, further folding lines 506' are provided between the lateral panels 3', 4' and corresponding connecting strips 31', 41', and between the latter 31', 41' and the corresponding bottom panels 51', 52' for favouring the making of the container 1.

According to the preferred embodiment, the first and second connecting strips 31', 41', the second portion 511' of the first bottom panel 51' and the portion 7' of the first bottom panel 51' and at least one portion of a lateral panel 3', 4' are designed to receive adhesive, as will be made clearer in the description of the method which follows.

The invention further relates to a method for making a container 1 according to the embodiments described above starting from a blank 1' of the type described above.

The method comprises the following steps:

a) applying glue at al least on an edge of the first lateral panel (3') or the second lateral panel (4') of the blank (1') and at the portion (7') of the first bottom panel (51') intended to define the first abutment flap (7) of the container (1); and successively:

b) folding the first bottom panel 51' and the second bottom panel 52' on the inner surface 30', 40' of the first lateral panel 3' and the second lateral panel 4' respectively;

c) folding outwards a second portion 511' of the first bottom panel 51', keeping the first portion 510' on the inner surface 30' of the first lateral wall 3';

and successively:

d) applying glue on the folded second portion 511' of the first bottom panel (51');

e) folding the second lateral panel 4' and the second bottom panel 52' on the first lateral panel 3', in such a way that the second bottom panel 52' and the second portion 511' of the first bottom panel 51' are overlapped and in contact;

and successively:

f) shaping the container 1, pushing the second bottom panel 52' and the first bottom panel 51' towards the outside of the container 1 (that is, towards the relative lower end 20), in such a way that the portion 7' corresponding to the first abutment flap 7 is detached from the first bottom panel 51' and is bonded to the inner surface 30' of the first lateral panel 3', and the tab 8' of the second bottom panel 52' is folded against the inner surface 30' of the first panel and abuts the portion 7' (as described above for the container 1).

With reference to the embodiment of the blank 1' comprising the first connecting strip 31' and the second connecting strip 41', respectively positioned between the first lateral panel 3' and the first bottom panel 51', and between the second lateral panel 4' and the second bottom panel 52', the method according to the invention also comprises the steps of:

g) applying glue on the first connecting strip 31' and the second connecting strip 32' and h) folding also the first connecting strip 31' and the second connecting strip 32' respectively on the inner surface 30', 40' of the first lateral wall 3' and the second lateral wall 4' together with the first bottom panel 51' and the second bottom panel 52'.

The invention claimed is:

1. A container for articles, comprising:

an upper end and a lower end opposing each other;

a first lateral wall and a second lateral wall connected to each other, each having an inner surface and an outer surface;

a bottom, disposed at said lower end of the container and comprising a first bottom wall connected to the first lateral wall and a second bottom wall connected to the second lateral wall, the first bottom wall and the second bottom wall overlapping each other such that the first bottom wall is more external than the second bottom wall considering an inner volume of the container;

an upper opening opposed to the bottom;

a bottom blocking mechanism for blocking the bottom, comprising:

a first abutment flap fixed to the inner surface of the first lateral wall, substantially at the lower end of the container and comprising a lower abutment edge; and a second abutment flap comprising an upper abutment edge and connected to the second bottom wall; the second abutment flap being at last partially folded against the inner surface of the first lateral wall, at the lower end of the container for abutting the upper abutment edge with the lower abutment edge of the first abutment flap; and wherein the first bottom wall has in a relative first portion, proximal to the first lateral wall, an opening with dimensions equal or greater to those of the first abutment flap;

wherein the first abutment flap is obtained by a detachment from the first bottom wall along a preferential fracture line.

2. The container according to claim 1, in which the bottom, the first and the second bottom walls and the bottom blocking mechanism are made of cellulose-based sheet material, and in which the first abutment flap is glued to the inner surface of the first lateral wall.

3. The container according to claim 1, wherein the lower end comprises an end edge which has a closed loop profile; and wherein the bottom is positioned at a certain distance which is not zero from the end edge, to not protrude beyond the end edge.

4. A blank for producing the container according to claim 1, the blank comprising:

a first lateral panel and a second lateral panel connected to each other and suitable for defining respectively the first lateral wall and the second lateral wall of the container;

a first bottom panel and a second bottom panel, each comprising a perimetral edge; the first bottom panel and the second bottom panel being connected respectively to the first lateral panel and the second lateral panel and being suitable to be overlapped with each other to define the bottom of the container;

a preferential fracture line provided on the first bottom panel in a corresponding first portion which delimits a portion equal to the first abutment flap of the container; and a tab connected to the second bottom panel and protruding with respect to the corresponding perimetral edge, intended to define said second abutment flap of the container.

5. The blank according to claim 4, in which the first bottom panel comprises a longitudinal folding line separating said first portion from a remaining second portion; the first portion being proximal to the first lateral panel with respect to the second portion.

6. The blank according to claim 4, and further comprising a first connecting strip and a second connecting strip, placed between the first lateral panel and the first bottom panel and between the second lateral panel and the second bottom panel respectively.

7. A method for producing a container starting from a blank, the method comprising the steps of:

providing a blank for producing the container, the blank comprising:

a first lateral panel and a second lateral panel connected to each other and suitable for defining respectively the first lateral wall and the second lateral wall of the container;

a first bottom panel and a second bottom panel, each comprising a perimetral edge; the first bottom panel and the second bottom panel being connected respectively to the first lateral panel and the second lateral panel and being suitable to be overlapped with each other to define a bottom of the container;

a preferential fracture line provided on the first bottom panel in a corresponding first portion which delimits a portion equal to the first abutment flap of the container; and a tab connected to the second bottom panel and protruding with respect to the corresponding perimetral edge, to define said second abutment flap of the container;

a) applying glue at least at an edge of the first lateral panel or the second lateral panel of the blank and at a portion of the first bottom panel intended to define the first abutment flap of the container; and successively b) folding the first bottom panel and the second bottom panel on the inner surface of the first lateral panel and the second lateral panel respectively;

c) folding outwards a second portion of the first bottom panel, keeping the first portion on the inner surface of the first lateral wall; and successively d) applying glue at the folded second portion of the first bottom panel;

e) folding the second lateral panel and the second bottom panel on the first lateral panel, so that the second bottom panel and the second portion of the first bottom panel are overlapped; and successively f) shaping the container pushing the second bottom panel and the first bottom panel towards an outside of the container, so that the portion is detached from the first bottom panel and is bonded to the inner surface of the first lateral panel; and the tab of the second bottom panel is folded against the inner surface of the first lateral panel abutting the portion;

thereby forming the container comprising:

an upper end and a lower end opposing each other;

a first lateral wall and a second lateral wall connected to each other, each having an inner surface and an outer surface;

the bottom, disposed at said lower end of the container, comprising a first bottom wall connected to the first lateral wall and a second bottom wall connected to the second lateral wall, the first bottom wall and the second bottom wall overlapping each other such that the first bottom wall is more external than the second bottom wall considering an inner volume of the container;

an upper opening opposed to the bottom;

a bottom blocking mechanism for blocking the bottom, comprising:

a first abutment flap fixed to the inner surface of the first lateral wall, substantially at the lower end of the container and comprising a lower abutment edge; and a second abutment flap comprising an upper abutment edge and connected to the second bottom wall; the second abutment flap being at last partially folded against the inner surface of the first lateral wall, at the lower end of the container for abutting the upper abutment edge with the lower abutment edge of the first abutment flap; and wherein the first bottom wall has in a relative first portion, proximal to the first lateral wall, an opening with dimensions equal or greater to those of the first abutment flap;

wherein the first abutment flap is obtained by a detachment from the first bottom wall along a preferential fracture line.

8. The method according to claim 7 and further comprising the steps of:

g) applying glue on the first connecting strip and the second connecting strip; and h) folding also the first connecting strip and the second connecting strip respectively on the inner surface of the first lateral wall and the second lateral wall together with the first bottom panel and the second bottom panel.

* * * * *